United States Patent [19]

Tchao et al.

[11] Patent Number: 5,581,681
[45] Date of Patent: *Dec. 3, 1996

[54] POINTING GESTURE BASED COMPUTER NOTE PAD PAGING AND SCROLLING INTERFACE

[75] Inventors: Michael C. Tchao, Palo Alto; Stephen P. Capps, San Carlos, both of Calif.

[73] Assignee: Apple Computer, Inc., Cupertino, Calif.

[ * ] Notice: The term of this patent shall not extend beyond the expiration date of Pat. No. 5,398,310.

[21] Appl. No.: 474,744

[22] Filed: Jun. 7, 1995

Related U.S. Application Data

[63] Continuation of Ser. No. 357,707, Dec. 14, 1994, which is a continuation of Ser. No. 868,013, Apr. 13, 1992, Pat. No. 5,398,310.

[51] Int. Cl.⁶ .................................................. G09G 5/34
[52] U.S. Cl. ........................................ 395/804; 395/761
[58] Field of Search .......................... 395/144, 155–157, 395/161; 345/123; 382/202

[56] References Cited

U.S. PATENT DOCUMENTS

| | | | |
|---|---|---|---|
| 4,620,295 | 10/1986 | Aiken, Jr. | 364/419.17 |
| 4,912,669 | 3/1990 | Iwamoto et al. | 364/419.17 |
| 5,049,862 | 9/1991 | Dao et al. | 345/179 |
| 5,065,438 | 11/1991 | Hirose et al. | 382/202 |
| 5,142,669 | 8/1992 | Inoue et al. | 395/157 |
| 5,200,738 | 4/1993 | Fumoto et al. | 345/123 |
| 5,220,649 | 6/1993 | Forcier | 395/148 |
| 5,339,391 | 8/1994 | Wroblewski et al. | 395/157 |
| 5,371,846 | 12/1994 | Bates | 395/157 |
| 5,493,641 | 2/1996 | Brown | 395/155 |

OTHER PUBLICATIONS

Acerson, WordPerfect The Complete Reference, 1988, pp. 64–65, 70–71, 292–295, 458–459, 716–719 1988.
Microsoft, Windows 3.0 User Guide, 1990, pp. 42–43, 221–257, 398–405 1990.
Straley, Straley's Programming With Clipper 5.0, 1991, p. 722 1991.
Press et al., Numerical Recipes, 1986, pp. 455, 499 1986.

*Primary Examiner*—Heather R. Herndon
*Assistant Examiner*—Anton W. Fetting
*Attorney, Agent, or Firm*—Hickman Beyer & Weaver

[57] ABSTRACT

A computer system for manipulating notes on a screen of a computer display is provided. Each note area may include graphical, text, and data objects. An initial note area is provided with a header bar which includes the date of creation, the note number, and/or other indicia. When a user desires to make a new note, a division gesture is made on the computer display by moving a stylus horizontally across the screen. Once a division gesture is detected, the height of the preceding note is determined, and the height of the new note is considered to be indefinite or infinite. Each new division gesture creates a new header bar for the new note indicating the date of creation, the note number, and/or other pertinent information.

37 Claims, 15 Drawing Sheets

POINTING GESTURE BASED COMPUTER NOTE PAD PAGING AND SCROLLING INTERFACE

This is a continuation of application Ser. No. 08/357,707 filed Dec. 14, 1994, which is a continuation of application Ser. No. 07/868,013 filed Apr. 13, 1992, which issued as U.S. Pat. No. 5,398,310 on Mar. 14, 1995.

BACKGROUND OF THE INVENTION

The present invention relates generally to the manipulation of images on a computer screen, and more particularly to methods for manipulating images on the screen of a pen-based computer system.

A pen-based computer system is a small, often hand-held, computer system where the primary method for inputting data includes a "pen" or stylus. A typical pen-based computer system is housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of the stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen. With suitable recognition software, text and numeric information can also be entered into the pen-based computer system in a similar fashion.

Users often want to input more than one screen-full of information into their computer systems. To accomplish this, computer systems of the prior art have adopted two different input and display techniques. With a first technique, the screen images are treated as "pages" of a notepad. Users can then either sequentially access pages by "flipping" back or forth through the notepad, or they can jump to a particular page by page number. A second technique is to consider the screen of the display assembly to be a "window" on a long, continuous scroll of paper. The "scroll" is moved past the imaginary window (or the window is moved along the scroll) to provide a partial display of the contents of the scroll on the computer screen.

Both of these techniques have their advantages and disadvantages. The paging technique has the disadvantage of having a fixed page size which is usually equal to the size of the computer's screen. In consequence, if an image is too big to fit on one page, it must be divided to fit on two or more separate pages. While this is not particularly limiting for text, it makes the handling of large graphical images difficult. On the positive side, "paging" tends to be an intuitive way for users to access multiple screens of information. Users are familiar with the use of conventional books, notebooks, and notepads, all of which are essentially page based artifacts. An example of the intuitive nature of paging involves visually locating an image which was created on a particular page of memory. If, for example, a user knows that he drew a particular image in the lower right-hand corner of a page, he can quickly "flip" through the multiple pages while fixing his eyes on the lower right-hand corner of the screen to quickly spot the appropriate image.

The advantages and disadvantages of the scrolling technique are almost precisely the reverse of the advantages and disadvantages of the paging technique. An advantage of the scrolling technique is that images of virtually any length can be created. A disadvantage of the scrolling technique is that it is less intuitive than the paging technique. Using the previous example, finding a particular image by scrolling tends to be more difficult than finding the image by paging. This is due, in part, to the fact that when scrolling through the images stored in the computer, a particular desired image can be located at any vertical location on the screen, requiring a user to visually search a much larger image area. Also, with the scrolling technique it is more difficult for a user to know his or her relative location in a document. For example, with the paging technique a user might intuitively know that a desired image is about on page twelve, or is about two thirds of the way through the document. This type of intuitive knowledge is more difficult to achieve with the scrolling technique.

A further disadvantage of the scrolling technique is that it is inherently slow since images on the screen must not be moved so fast that they cannot be viewed. This can make the viewing of large amounts of data by scrolling techniques a time consuming process.

Yet another disadvantage of scrolling techniques is that there is no clear division between adjacent but unrelated images. For example, if a user first writes a letter and then makes a sketch, it would be desirable to make a clear division between these two unrelated items. This disadvantage also applies to a lesser extent to paging techniques when two or more unrelated items are placed on a single page.

SUMMARY OF THE INVENTION

In the present invention, images are grouped into note areas which form part of a continuous scroll. These notes are manipulated by: (a) generating an initial note area on the screen of a computer display; (b) dividing the initial note area into a number of contiguous note areas in response to one or more division gestures implemented by a pointing device, where each division gesture creates a header bar on the screen which visually separates two adjacent note areas; (c) modifying the size of a selected note area in response to a sizing gesture made to a header bar associated with the selected note area; and (d) scrolling within the note areas in response to a scrolling command.

The initial note area is provided with a header bar which preferably includes the date of creation, the note number, and other indicia. This initial note area can be considered to be of indeterminate or infinite height. Graphical, text, and data objects can be created within this initial note area.

When a user desires to make a new note, a division gesture is made on the computer display with a pointing device. For example, in a pen-based computer system a stylus can be moved substantially horizontally across the screen to indicate a division gesture. Once a division gesture is detected, the height of the preceding note is determined, and the height of the new note can be considered to be indefinite or infinite. Preferably, the division gesture creates a new header bar for the new note indicating the date of creation, the note number, and/or other pertinent information.

Preferably, each header bar also includes a "sizing" button. By making a sizing gesture to the sizing button, the height of the associated note can be modified to make the note longer or shorter.

The notes on the display are preferably scrolled in a fashion which is a hybrid between traditional paging and scrolling techniques. The scrolling technique of the present invention can be considered to be a "quantized" scroll where objects displayed on the screen tend to be located in the same area of the screen in which they were created. This is accomplished by scrolling in quantized jumps such that the header bar of a desired note jumps either to the top of the screen or to about its original creation location on the screen.

The note areas and quantized scroll of the present invention overcome many of the aforementioned problems of the prior art. Related objects can be grouped together in a single note, and notes longer than a screen length can be easily generated. The height of individual notes can be modified by the sizing gesture, and the quantized scrolling of the present invention allows for the quick, intuitive scan of a large number of notes.

These and other advantages of the present invention will become apparent to those skilled in the art upon a reading of the following specification of the invention and a study of the several figures of the drawing.

DETAILED DESCRIPTION OF THE PREFERRED EMBODIMENTS

Figure 1:
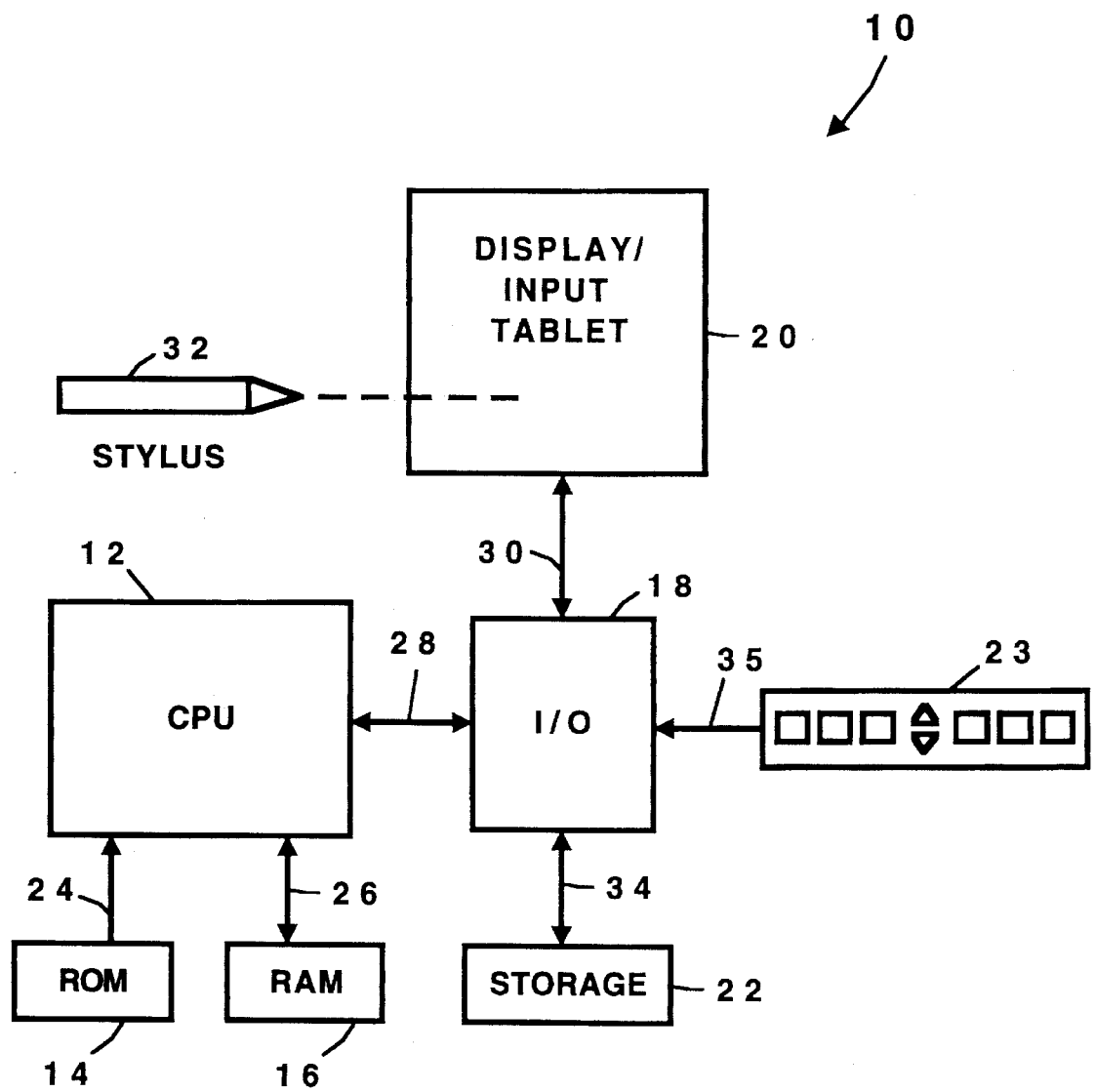
FIG. 1 is a block diagram of a pen-based computer system in accordance with the present invention.

In FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or non-volatile memory such as flash memory, and an array of input buttons 23.

The CPU 12 is preferably a commercially-available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a uni-directional data bus 24. ROM 14 contains the basic operating system for the pen-based computer system 10. CPU 12 is connected to RAM 16 by a bi-directional data bus 26 to permit the use of RAM 16 as scratch pad memory. ROM 14 and RAM 16 are also coupled to CPU 12 by appropriate control and address busses, as is well known to those skilled in the art. CPU 12 is further coupled to the I/O circuitry 18 by bi-directional data bus 28 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the array of input buttons 23.

Display assembly 20 of pen-based computer system 10 is both an input and an output device. Accordingly, it is coupled to I/O circuitry 18 by a bi-directional data bus 30. When operating as an output device, the display assembly 20 receives data from I/O circuitry 18 via bus 30 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 32 on its surface. These position-sensitive membranes are also readily available on the commercial market. Combination display assemblies such as display assembly 20 which include both the LCD and the input membrane are commercially available from such vendors as Scriptel Corporation of Columbus, Ohio.

Other types of pointing devices can also be used in conjunction with the present invention. While the method of the present invention is described in the context of a pen-based system, other pointing devices such as a computer mouse, a track ball, or a tablet can be used to manipulate a pointer on a screen. Therefore, as used herein, the terms "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of RAM 16 to store user application programs and data. In that instance, the RAM 16 could be provided with a back-up battery to prevent the loss of data even when the pen-based computer system 10 is turned off. However, it is generally desirable to have some type of long term storage 22 such as a commercially available miniature hard disk drive, or non-volatile memory such as flash memory or battery-backed RAM.

In operation, information is input into the pen-based computer system 10 by "writing" on the screen of display assembly 20 with the stylus 32. Information concerning the location of the stylus 32 on the screen of the display assembly 20 is input into the CPU via I/O circuitry 18. The CPU 12 then processes the data under control of an operating system and possibly an application program stored in ROM 14 and/or RAM 16. The CPU 12 then produces data which is output to the display assembly 20 to produce appropriate images on its screen.

Figure 2:
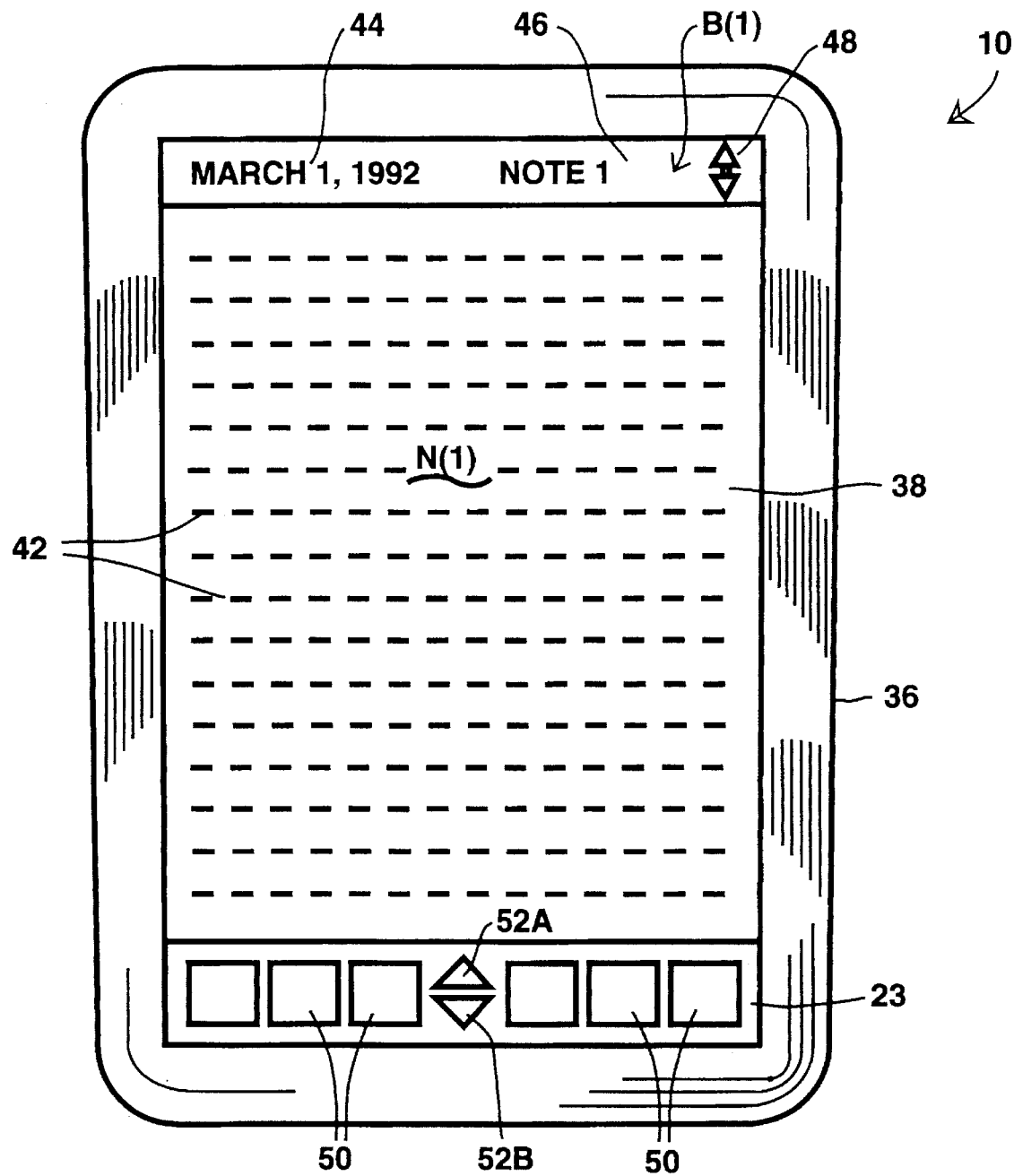
FIG. 2 is a pictorial representation of the screen of a computer display assembly of the present invention.

In FIG. 2, the pen-based computer system 10 is shown housed within a generally rectangular enclosure 36. The CPU 12, ROM 14, RAM 16, I/O circuitry 18, and mass storage 22 are preferably fully enclosed within the enclosure 36. The display assembly 20 is mostly enclosed within the enclosure 36, but a viewing screen 38 of the display assembly is exposed to the user. As used herein, the term "screen" will refer to the portion of the display assembly 20 which can display an image that can be viewed by a user. Also accessible to the user are the array of input buttons 23.

Upon power-up, pen-based computer system 10 displays on screen 38 an initial note area N(1) including a header bar B(1) and a number of guidelines 42. The header bar B(1) preferably includes the date of creation 44 of the note N(1), a note number 46, and a sizing "button" 48. The optional guidelines 42 aid a user in entering text, graphics, and data into the pen-based computer system 10.

In this preferred embodiment, the array of input buttons 23 are not part of the screen 38 but, rather, are permanent, hard-wired input buttons coupled to the CPU 12 by I/O circuitry 18. Alternatively, the array of input buttons 23 could be "soft" buttons generated at a convenient location on the screen 38, in which case a button would be activated by touching the stylus to the screen over the image of the button. The array of input buttons 23 preferably include a number of dedicated function buttons 50 and a pair of scroll buttons 52A and 52B. The function of the scroll buttons 52A and 52B will be discussed in greater detail subsequently.

Figure 3:
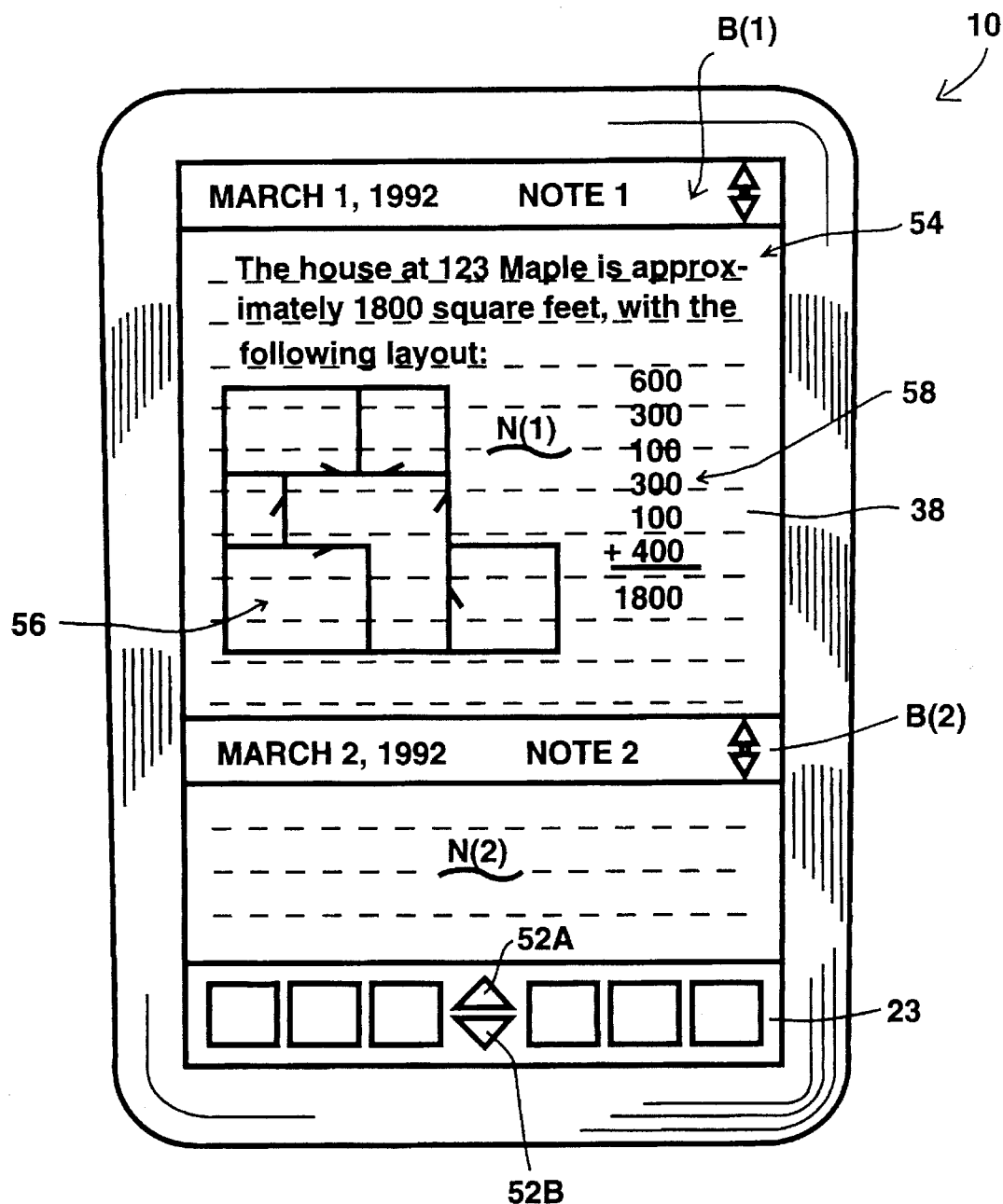
FIG. 3 illustrates the screen of FIG. 2 after graphical, text and data objects have been added, and after the screen has been divided into two note areas.

In FIG. 3, several types of images or objects have been entered into the computer system 10 by the stylus 32. More particularly, in note N(1), a text object 54 describing a house at 123 Maple Street is entered near the top of the screen 38, a sketch of the layout for the house is entered as a graphic object 56, and calculations of the square footage have been entered as a data object 58. Furthermore, a new header bar B(2) has been added to create an additional note area N(2), and to separate this additional note area N(2) frown the initial note area N(1).

Figure 4:
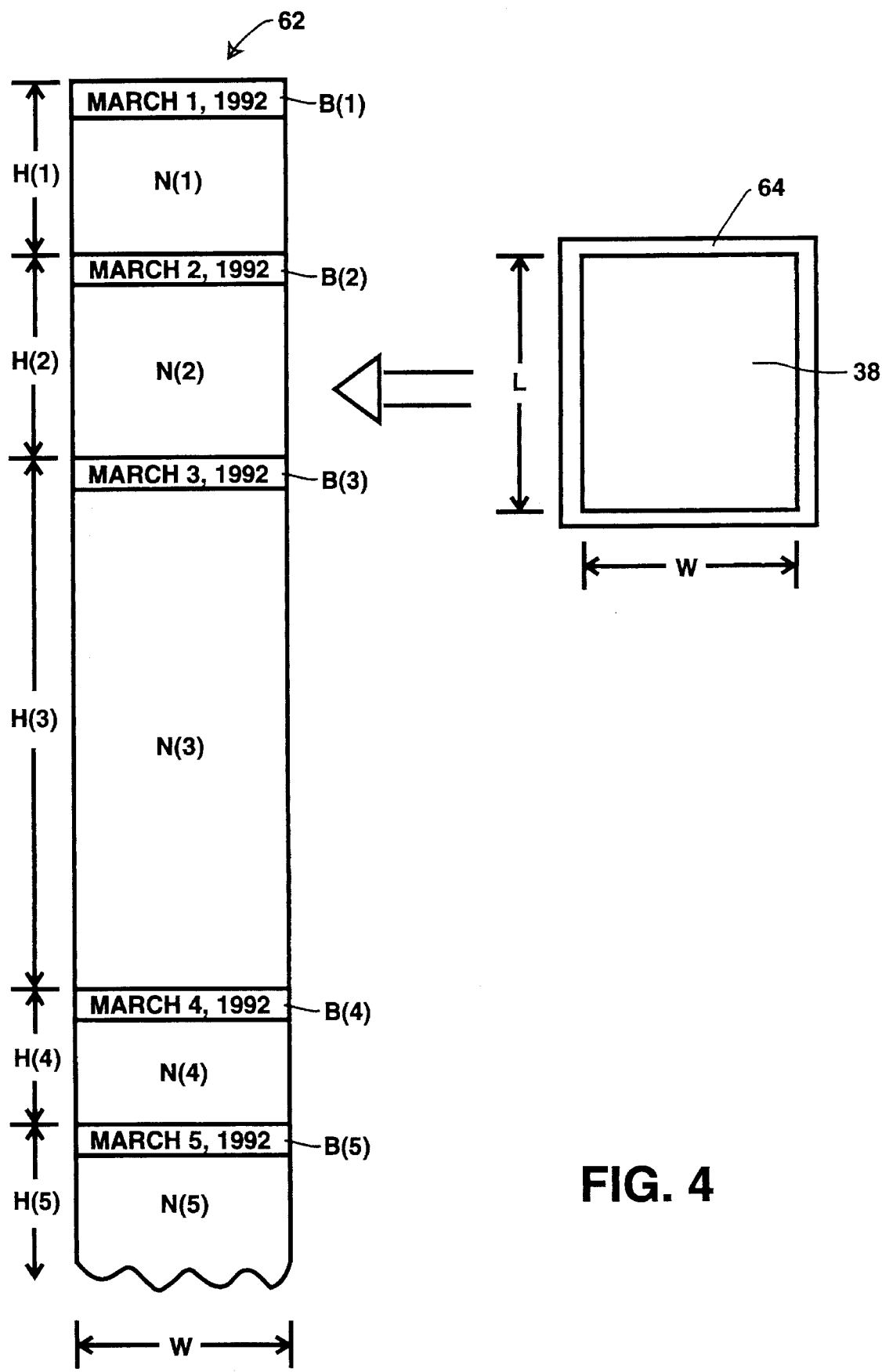
FIG. 4 graphically illustrates a number of note areas arranged in a scroll and a "window" representing the screen of the computer display.

A conceptual representation of the images seen on screen 38 will be discussed with reference to FIG. 4. In FIG. 4, the screen images can be conceptualized as being printed on a long scroll 62 of paper, where only a portion of the scroll can be viewed at a time through a window 64 (corresponding to the screen 38 of the display assembly 20). The width w of screen 38 is preferably equal to the width W of the scroll 62. If, however, the width w of the screen 38 is less than the width W of the scroll 62, the entire width W of the scroll 62 can be viewed by a lateral scroll, as is well known to those skilled in the art.

Also seen in FIG. 4, the scroll 62 includes the initial note area N(1) and can also include one or more additional note areas N(2), N(3), etc. All of the note areas have an associated header bar B(1), B(2), B(3), etc. along their upper edge.

As mentioned previously, portions of the scroll 62 can be viewed through the screen 38 of window 64. To view other portions of the scroll 62, the images are "scrolled" up or down past the screen 38. As used herein, an up-scroll will permit lower numbered note areas to be seen, and a down-scroll will allow higher numbered note areas to be seen. Therefore, an up-scroll can be visualized as moving the window 64 upwardly along the scroll 62, or by moving the scroll 62 downwardly past window 64. Similarly, a down-scroll can be visualized as moving the window 64 downwardly along the scroll 62, or by moving the scroll 62 upwardly past window 64.

Preferably, each of the note areas has the same width W. However, each of the note areas will have its own height depending upon where the header bar is drawn. For example, the height of the initial note N(1) is H(1), the height of the second note N(2) is H(2), the height of the third note N(3) is H(3), etc. The height of the last note of the scroll 62 (in this case H(5)) is indeterminate and can be considered infinite. Once a new header bar has been added to the bottom of note N(5), its height H(5) will become determinate, and the height of the new last note N(6) can be considered to be indeterminate or infinite.

Figure 5A:
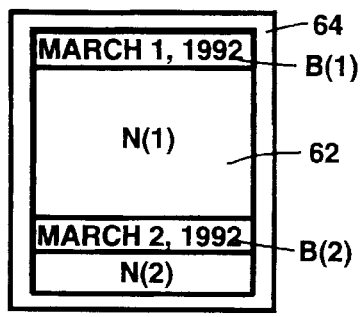
FIGS. 5a–5f illustrate six views of the scroll as seen through the window of FIG. 4.
Figure 5B:
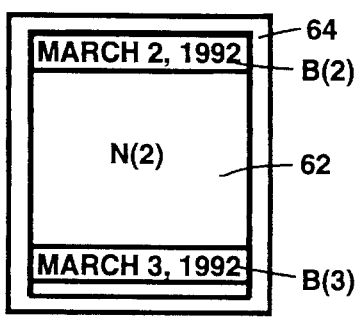
Figure 5C:
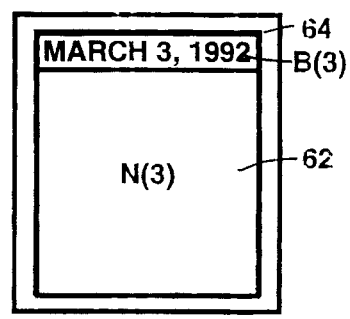
Figure 5D:
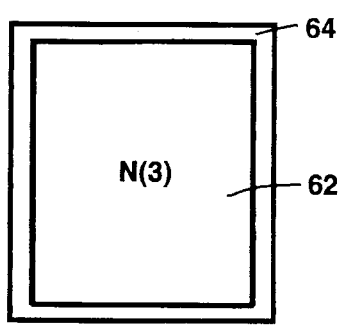
Figure 5E:
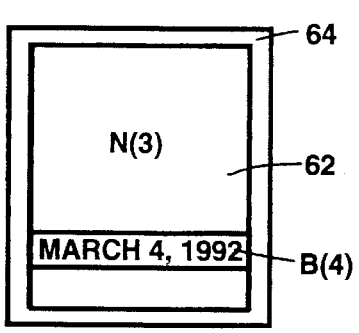
Figure 5F:
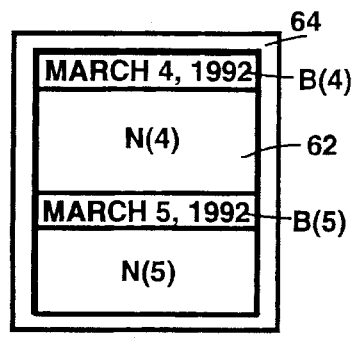

In FIGS. 5a–5f, a "quantized" down-scroll in accordance with the present invention will be described. In FIG. 5a, the window 64 is positioned at the top of scroll 62 to view the initial note N(1). The header bar B(1) of the initial note N(1) is at the top of the screen 38, and the header bar B(2) of additional note N(2) is positioned in the bottom third of screen 38. Upon the sensing of a down-scroll command by a user pressing button 52b, the header bar B(2) jumps to the top of screen 38 and the header bar B(3) moves onto the bottom portion of the screen 38. With another down-scroll command sensed as the button 52b is pressed, the header bar B(3) jumps to the top of screen 38 as shown in FIG. 5c. Since the height H(3) of note N(3) is greater than the length L of screen 38, only a portion of the note N(3) will be seen on the screen. In FIG. 5d, another down-scroll command permits the viewing of the middle of note N(3) without any header bars showing on the screen 38. Yet another down-scroll command will show the bottom portion of note N(3) along with the header bar B(4) of note N(4), as illustrated in FIG. 5e. Finally, in FIG. 5f, another down-scroll command will cause the header bar B(4) to jump to the top of screen 38 and the header bar B(5) will appear near the middle of the screen.

It should be apparent from the preceding description that the "quantized" scrolling technique of the present invention is a hybrid between prior art paging and scrolling techniques. In this invention, the images on the screen 38 can be viewed as if they were formed in a continuous scroll 62, but the scrolling action comprises discrete, quantized jumps rather than the continuous scrolling action of the prior art. In this way, various text, graphical and data objects will appear in approximately the same location on the screen 38 as they were when they were created, allowing a user to quickly jump through the images on scroll 62 to locate a desired object. For example, if a user knows that he drew a sketch near the lower left-hand corner of the screen 38, he can jump through the notes quickly, fixating his eye on the lower left-hand corner of the screen to find the appropriate image. The up-scroll technique operates in a similar fashion.

Figure 6:
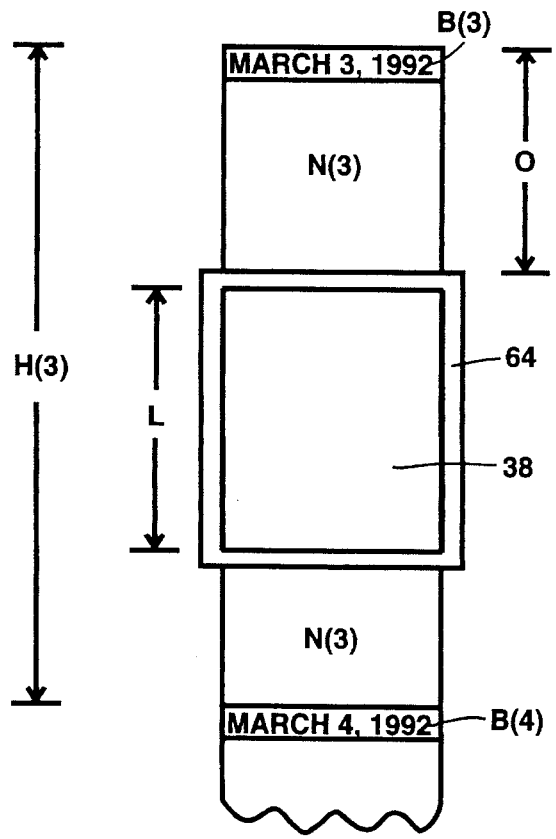
FIG. 6 illustrates the viewing of a note which has a height greater than the height of the viewing window.

FIG. 6 is used to illustrate the viewing of a note, such as note N(3), having a height greater than the length L of screen 38. Here, the window 64 is positioned near the middle of note N(3), corresponding to the image displayed in FIG. 5d. At this point, the header bar B(3) is offset from the top of screen 38 by an offset o. The offset o is used when re-drawing image on the screen 38, as will be discussed in greater detail subsequently.

Figure 7:
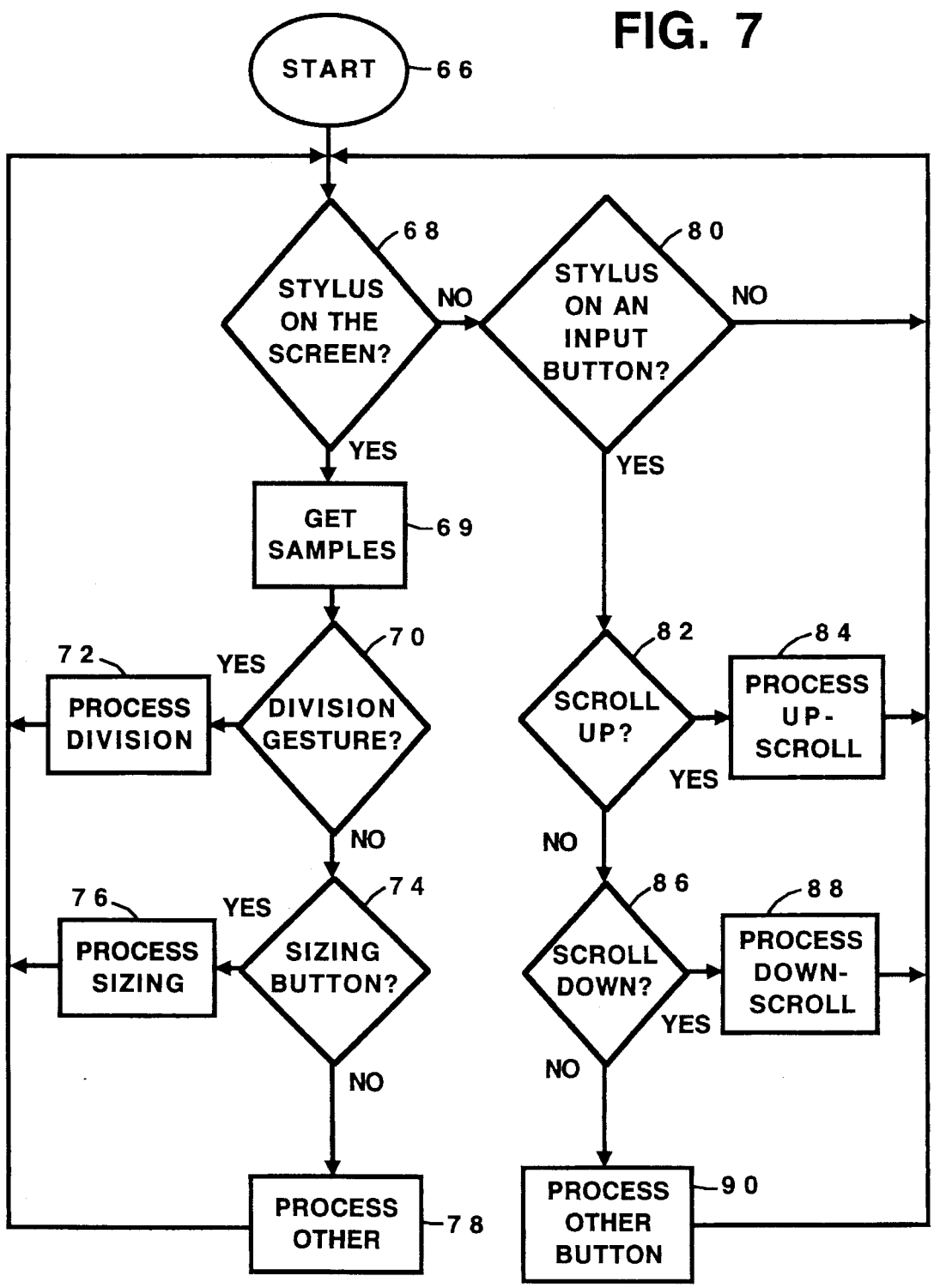
FIG. 7 is a flow diagram illustrating a method for manipulating notes on a computer display in accordance with the present invention.

A method for manipulating notes on a computer screen in accordance with the present invention will be discussed in greater detail with reference to FIG. 7. The process starts at 66, typically upon the power-up of the pen-based computer system 10. In a decision step 68 the CPU 12 decides whether the stylus 32 is positioned on the screen 38 of the computer system and, if it is, it stores sample points generated by display assembly 20 in a step 69. The CPU 12 then determines whether a division gesture is being made across the screen in a step 70. If the outcome of decision step 70 is that a division gesture is being made, the division gesture is processed in a step 72 and the CPU returns to step 68. If the decision of step 70 is that a division gesture had not been made, a decision step 74 determines whether the stylus is on a sizing button 48 of a header bar. If it is, a sizing command is processed in a step 76, and the process continues with step 68. If the stylus is on the screen as determined by decision step 68, but it is not making a division gesture and is not on a sizing button as determined by steps 70 and 74, the CPU 12 processes some other system function as indicated by step 78. These other system functions can include handwriting recognition, data recognition, etc.

If it is determined in step 68 that the stylus is not on the screen 36, the CPU 12 then determines whether the stylus is on an input button of the array of input buttons 23 in a decision step 80. If the stylus is on an input button, the CPU 12 determines whether it is on the scroll up button 52A in a decision step 82. If it is, the CPU 12 will process the scroll up command in a step 84 and then will return to step 68. If the CPU 12 determines that the scroll up button 52A is not being activated, it then determines whether the scroll down button 52B is being activated in a step 86. If it is, the scroll down command is processed in a step 88 and the process continues with step 68. If the CPU 12 has determined that a stylus is on an input button but it is neither on the scroll up button 52A nor the scroll down button 52B, other buttons are processed as indicated in step 90 and the process continues with step 68. These other process buttons 90 can include such functions as searching, storing, retrieving, faxing, etc.

As mentioned previously, the start step 66 typically occurs on power start-up of the pen-based computer system 10. It can also occur upon a hard-reset of the system 10 by a reset button (not shown), or by a soft-reset activated by a command on screen 38.

The step 68 of determining whether the stylus is on the screen is well-known to those skilled in the art of the design of pen-based computer systems. Typically, the display assembly 20 will send a timed series of data points (e.g. the x-y coordinates of the stylus point) to the I/O circuitry 18 whenever a stylus 32 is on the screen 38. If the stylus 32 is stationary, the series of data points will be the same, and if the stylus 32 is moving the series of data points will be different.

Likewise, the step 80 of deciding whether the stylus is on an input button of the array of input buttons 23 is well known to those skilled in the art. The CPU 12 typically causes the array of input buttons 23 to be periodically scanned for an activated button. Software debounce routines are often used to eliminate false readings.

Figure 8:
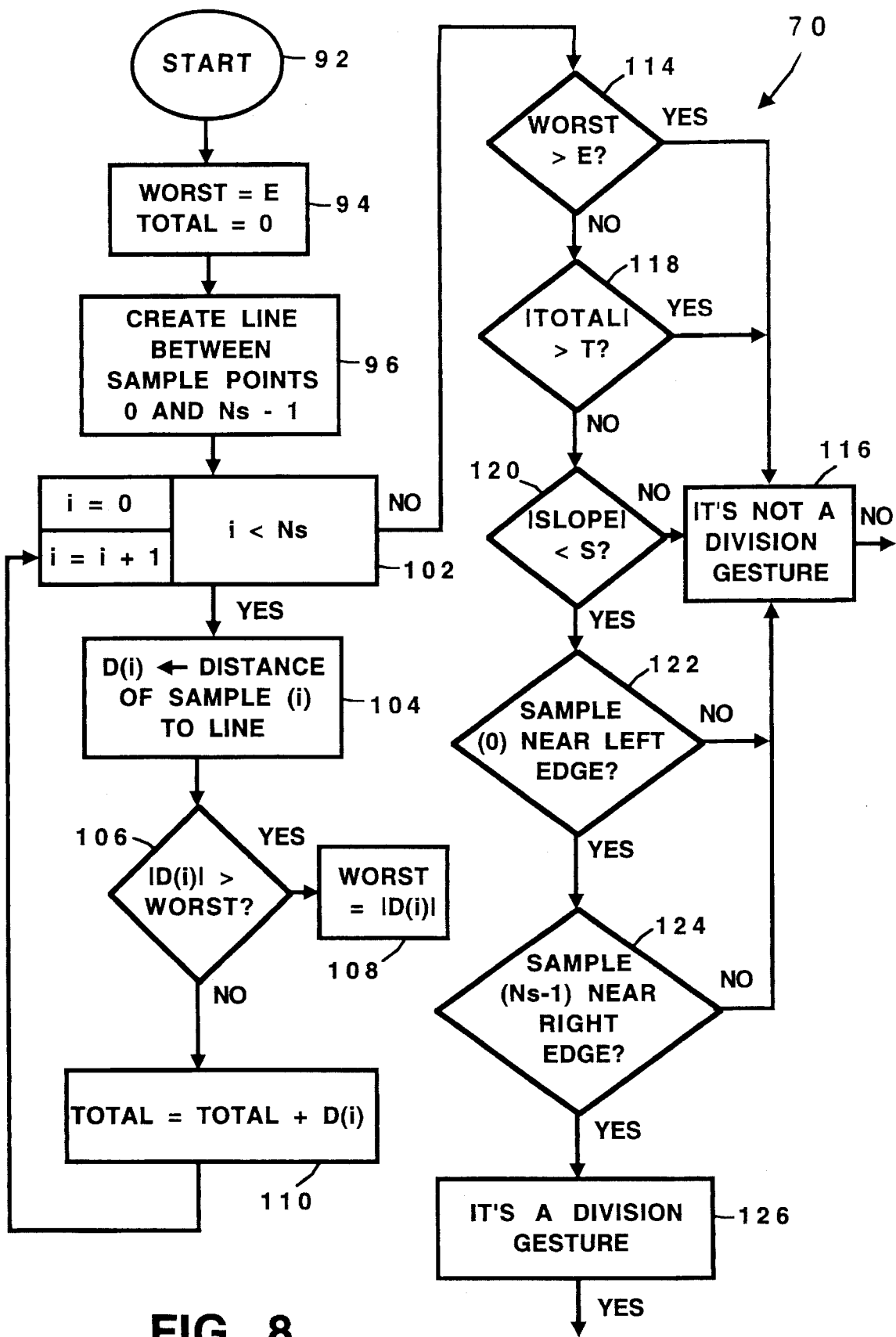
FIG. 8 is a flow diagram of a method for detecting a division gesture on the screen of a computer display assembly.

In FIG. 8, the step 70 of determining whether a stylus 32 is making a division gesture across the screen 38 is illustrated in greater detail. The step 70 starts at 92 and initializes certain parameters in a step 94. Two of these parameters are WORST, which is set to the value epsilon, and TOTAL, which is set to zero.

A division gesture in the present invention is a substantially horizontal line drawn across the surface 38 along substantially its entire width w. This gesture is internally represented by a number of sample points taken along the path of the stylus as it traverses the screen. If the total number of sample points for a given gesture is $N_S$, the sample points will be stored in a linear array SAMPLE ranging from SAMPLE(0) to SAMPLE($N_S$–1).

Figure 8A:
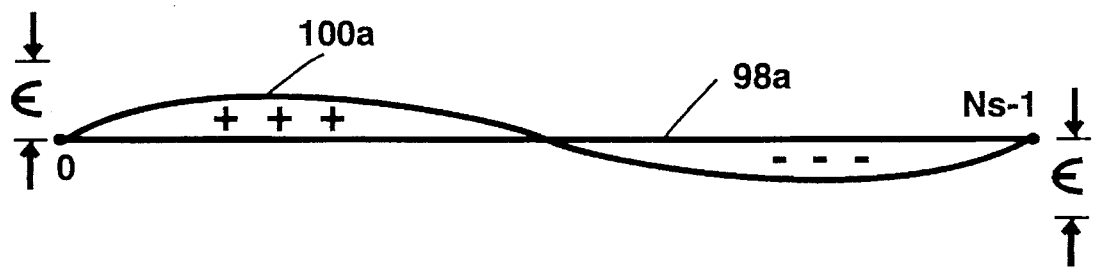
FIGS. 8A and 8B illustrate two of many potential gestures which can be made with a stylus, the first of which will be recognized as a division gesture and the second of which will not be recognized as a division gesture.
Figure 8B:
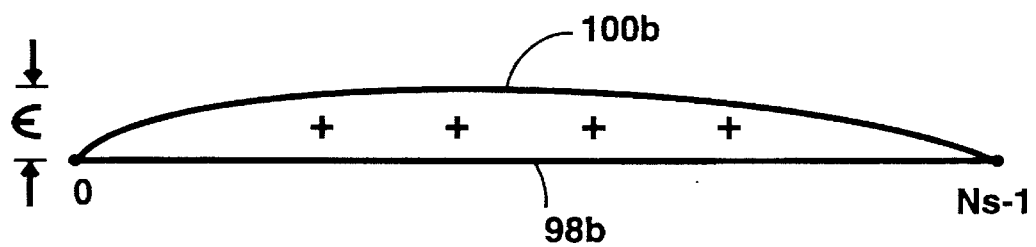

Next, in a step 96, a "theoretical" line is created by the CPU 12 by using sample points 0 and $N_S$–1 as end-points. A theoretical line 98A created by a gesture 100A is shown in FIG. 8A, and a theoretical line 98B created by a gesture 100B is shown in FIG. 8B. Alternatively, a theoretical line can be created by making a least mean square (LMS) fit of at least some, and preferably a majority or all, of the $N_S$ data points. The algorithms for making a LMS fit from a set of data points are well known.

The next step comprises a DO LOOP 102 which steps through the sample points using a counter i ranging from 0 to $N_S$–1. In a first iteration of the DO LOOP 102, a variable D(i) is assigned the value of the distance of sample point SAMPLE (i) to the theoretical line in a step 104. In a decision step 106, the absolute value of D(i) is compared to WORST, and if it is greater than WORST, the value of WORST is updated to the absolute value of D(i) in a step 108. If the absolute value of D(i) is not greater than WORST, or if step 108 has been performed, TOTAL is updated in a step 110 to equal the previous value plus D(i). The steps 104–110 are then iteratively processed for each of the sample points. After the completion of the DO LOOP 102, i.e. after $N_S$ iterations, the farthest distance of a sample point from the theoretical line will be stored in the variable WORST, and the total of the signed differences of the $N_S$ sample points will be stored in the variable TOTAL. Next, the variable WORST is compared to epsilon in a decision step 114, and if WORST is greater than epsilon, it is determined that the gesture is not a division gesture as indicated at 116.

In FIGS. 8A and 8B, both the gestures 100A and 100B meet the requirement step 114 of FIG. 8 because none of the $N_S$ sample points of gestures 100A or 100B are at a distance from the theoretical line 98A or 98B, respectively, which is greater than the predetermined value epsilon. In a preferred embodiment of the present invention, epsilon is chosen to be about six millimeters.

If it is determined in step 114 that the value of the variable WORST is less than epsilon, then a decision step 118 compares the value of TOTAL with a predetermined maximum total value T. In FIG. 8A, the value in TOTAL will be near zero because about half of the gesture 100A is above the theoretical line 98A and the other half of gesture 100A is below the line 98A. This will cause a cancellation of positive distances D(i) with negative distances D(i) to result in a near zero value for TOTAL. In contrast, the gesture 100B in FIG. 8B is entirely above the theoretical line 98B, resulting in a fairly large value for the variable TOTAL. If this large absolute value is greater than the predetermined value T, the gesture 100B is determined not to be a division gesture as indicated at 116. In the present embodiment, a value of T is approximately ten millimeters.

Next, the slope of the theoretical line is compared to a predetermined maximum slope S. The slope of the theoretical line is easily calculated as $\Delta Y/\Delta X$ between the sample points zero and $N_S-1$ and stored in the variable SLOPE. If the absolute value of SLOPE is greater than or equal to S, the CPU 12 determines that it is not a division gesture as indicated at 116. Preferably, the maximum value for S is approximately 10 degrees.

If, in a step 120, it is determined that the absolute value of SLOPE is less than the predetermined value S, it is determined in a step 122 whether SAMPLE(0) is near the left edge of the screen 38. If it is not, the gesture is determined not be a division gesture as indicated at 116. Currently, the SAMPLE(0) point must be within eight millimeters of the left edge of the screen 38 to be considered part of a division gesture.

If the SAMPLE (0) point is close enough to the left edge of screen 38, the right-most sample point SAMPLE ($N_S-1$) is compared to the right edge of the screen 38 in a step 124. If sample point SAMPLE ($N_S-1$) is not near the right edge, e.g. it is farther than eight millimeters from the right edge of screen 38, the gesture is determined not to be a division gesture as indicated at 116. If the last sample point is sufficiently close to the right edge, it is determined that the gesture is a division gesture as indicated at 126.

In summary, a theoretical line must meet the criteria of steps 114, 118, 120, 122, and 124 to be considered a division gesture. The failure of any one of these steps will result in the theoretical line being not considered a division gesture.

Figure 9:
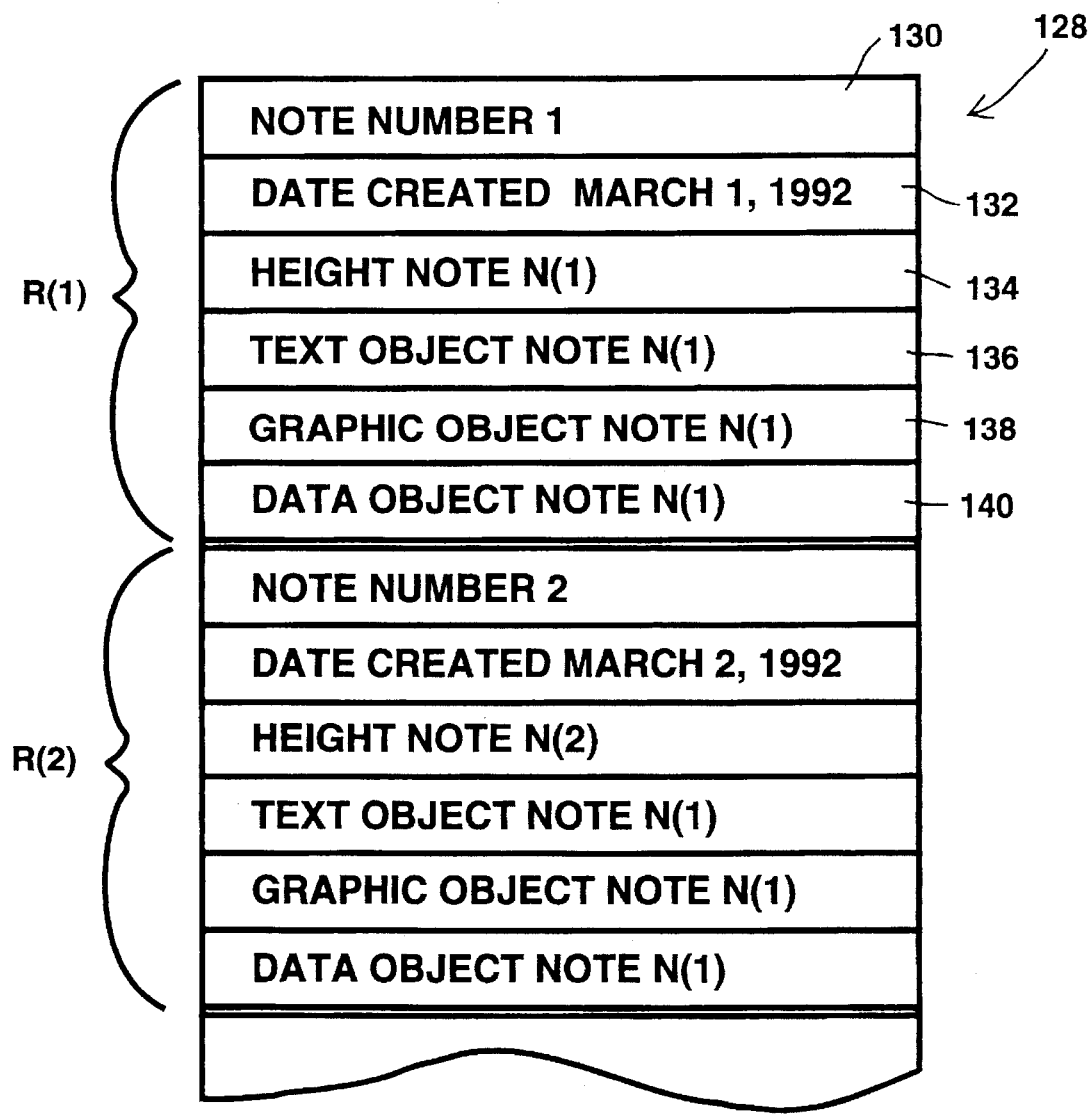
FIG. 9 illustrates the data structure of a note in accordance with the present invention.

In FIG. 9, a preferred data structure 128 for data stored within RAM 16 and/or mass storage 22 is illustrated. All the associated data for a particular note can be stored in a record area R in the data structure 128. For example, the information for note N(1) can be stored in record area R(1), and the information for note N(2) can be stored in record location R(2). Of course, various portions of a record could be stored in non contiguous locations in memory and then linked back to a particular record area by an appropriate pointer.

Taking record R(1) as an example, each record includes a number of discrete fields including a note number field 130, a creation date field 132, a height field 134, a text object field 136, a graphic object field 138, and a data object field 140. Each object field can, itself, contain other object fields of the same or different types. The note number field 130 stores the note number corresponding to that record. The date created field 132 includes the date of the note's creation. This date of creation can be automatically inserted into the date created field 132 by the operating system of the pen-based computer system 10. The height field 134 stores the height of the note as measured from the top of the current note's header bar to the top of the next adjacent note's header bar. If the note is the last note, the height will be considered to be indeterminate or infinite. Text objects, such as text objects 54 of FIG. 3, are stored in field 136, graphic objects such as graphic object 56 are stored in field 138, and data objects such as object 58 are stored in field 140.

It can be noted from the data structure 128 that the height of any note can be modified by changing the value stored in the height field 134. This feature allows a note to be re-sized, as will be discussed in greater detail with reference to FIGS. 11 and 12.

Figure 10:
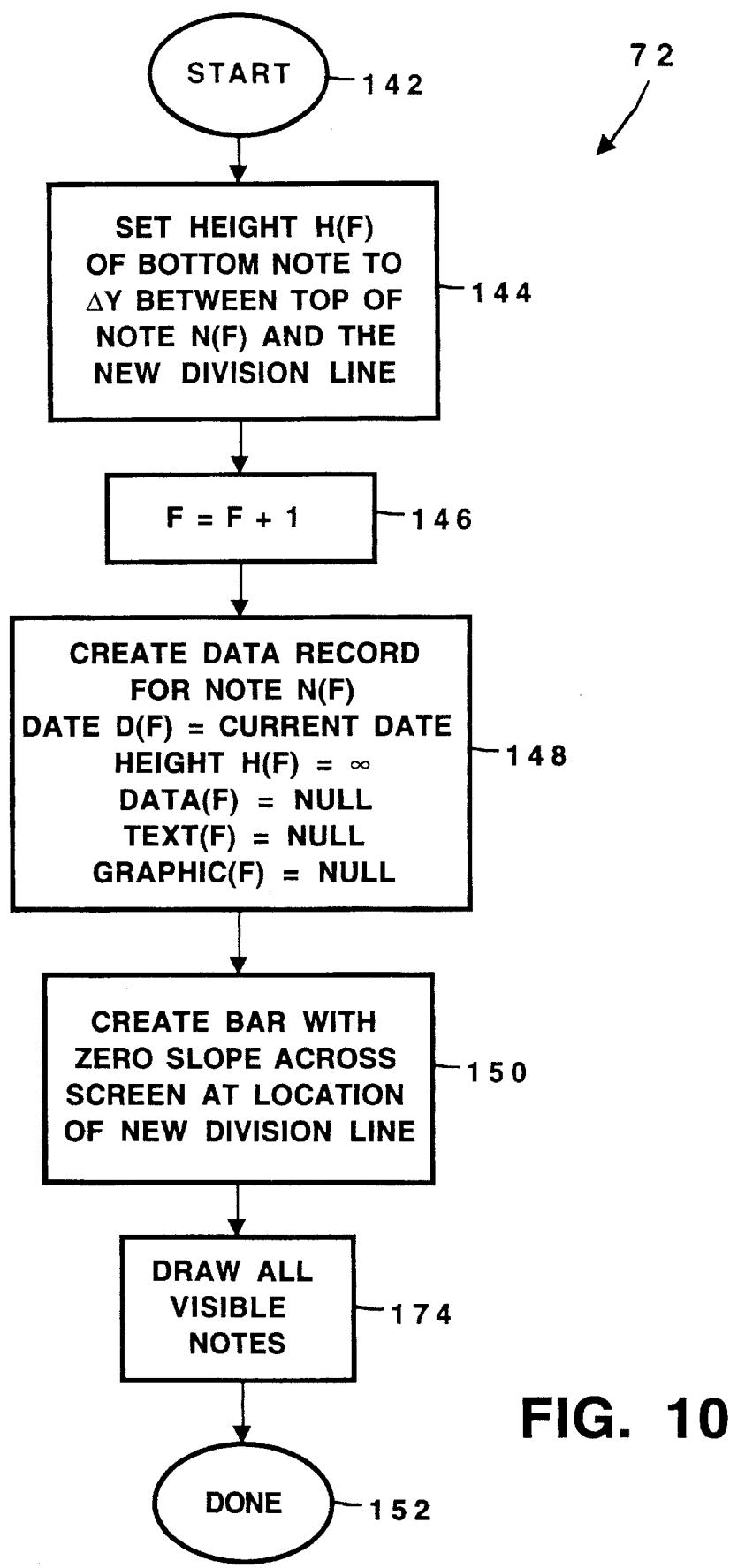
FIG. 10 is a flow diagram illustrating a method for processing the division gesture detected by the method illustrated in FIG. 8.

FIG. 10 illustrates the process division step 72 in greater detail. The process starts at 142 after a division gesture has been recognized by step 70. If F designates the final note number, the height H(F) of note N(F) is set to the distance $\Delta Y$ between the top of the header bar of note N(F) and the newly created header bar in step 144. This is accomplished by updating the height field 134 of record R(F). The number F is then incremented by 1 in a step 146 to indicate that a new note has been created.

A record R(F) for note N(F) is then created in a step 148. For example, the date field D(F) 132 is set for the current date, the height field H(F) 134 is set to infinity, and the text TEXT(F), graphic GRAPHIC(F), and data DATA(F) object fields 136, 138, and 140, respectively, are set to null. These actions create a new note area into which data, text, and graphic objects can be stored. In a step 150, a header bar having a zero degree slope is created at the location of the division line, and appropriate guidelines 42 are created for the new note area. Preferably, the header bar is provided with a creation date, note number, and sizing button such as the creation date 44, note number 46 and sizing button 48 shown in FIG. 2. Next, all visible notes on the screen 38 are drawn in a step 174, which will be discussed in greater detail with reference to FIG. 13. The process division step 72 is then completed as indicated at 152.

Figure 11:
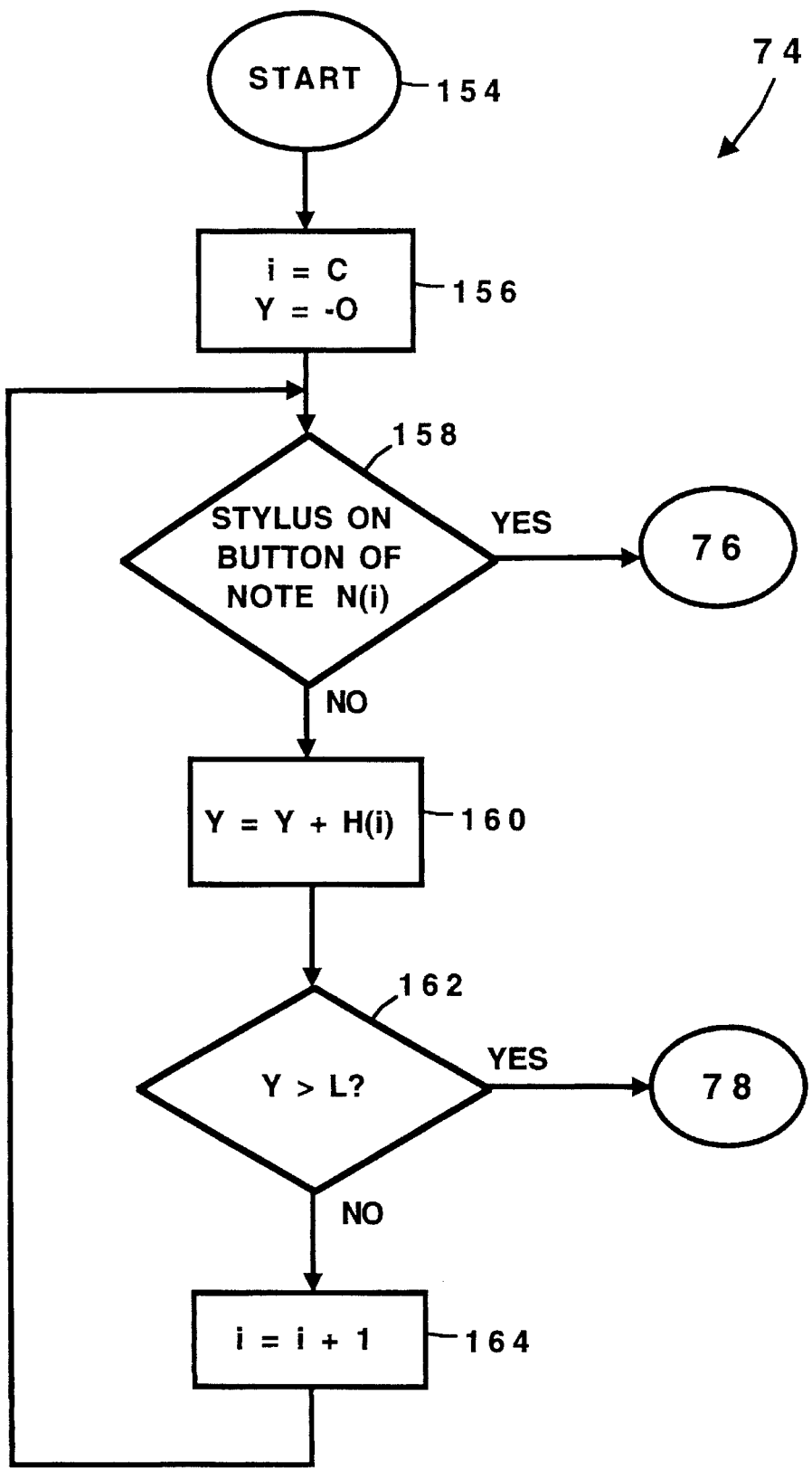
FIG. 11 is a flow diagram illustrating a method for detecting a sizing gesture of a selected note.

FIG. 11 illustrates, in greater detail, the step 74 of detecting a sizing gesture. Process 74 starts at 154, and an initialization step 156 initializes several process parameters. More particularly, in step 156 a counter i is set to the value of C, which is the current note number. The vertical distance Y is then set to the negative of the current; i.e. Y=−o.

In a step 158, it is determined whether the stylus is on the sizing button of note N(i). If the stylus is on the sizing button of note N(i), the CPU 12 processes the process sizing algorithm of step 76. If the stylus is not on the sizing button of note N(i), then the variable Y is increased by the height H(i) of note N(i) in a step 160. If the variable Y is greater than L (the length of the screen) as determined by a decision step 162, then all visible sizing buttons have been analyzed and the process continues with step 78. If step 162 determines that Y is not greater than L, then the counter i is incremented by one in a step 164 and the process is repeated starting at step 158.

Figure 12:
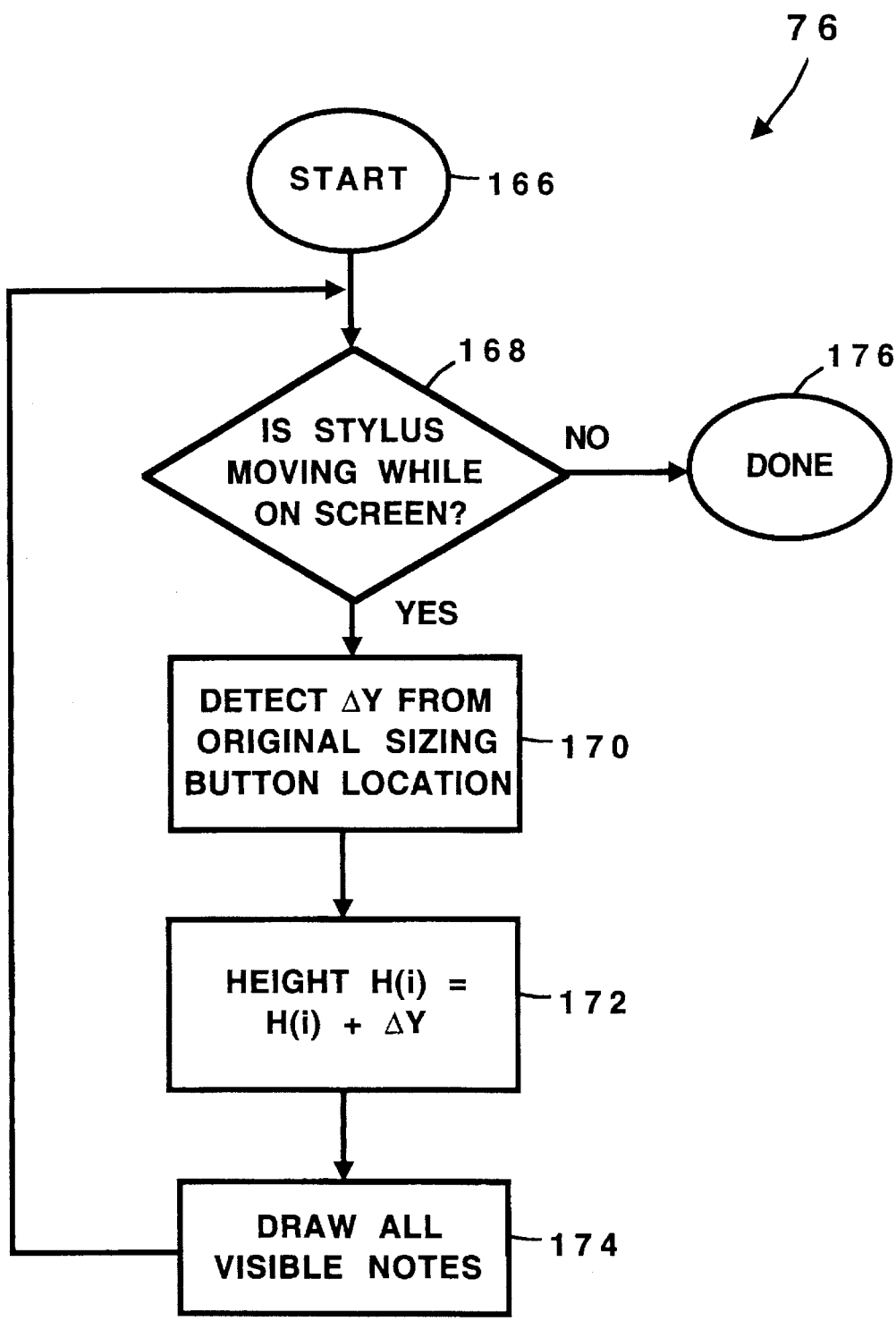
FIG. 12, is a flow diagram illustrating a method for processing the sizing gesture detected by the method illustrated in FIG. 11.

The process sizing step 76 is illustrated in greater detail in FIG. 12. The process begins at 166, and a decision step 168 determines whether the stylus is moving while it is still on the screen. As will be appreciated by those skilled in the art, this is easily accomplished by analyzing the series of data points provided by the display assembly 20 whenever the stylus is in contact with the screen 38. If it is, the CPU 12 concludes that the user is making a sizing gesture to note N(i). Under these circumstances, step 170 calculates a vertical distance $\Delta Y$ that is the difference between the current stylus location and the original location of the sizing button. The data record R(i) is then modified for note N(i) such that the height H(i) is set to H(i)+$\Delta Y$ in a step 172. Next, in a step 174, all visible notes (or portions thereof) are drawn on the screen 38. Steps 168, 170, 172, and 174 are then repeated until the stylus is no longer moving while on the screen as determined in by step 168, at which time the process is completed as indicated at 176.

It should be noted that the sizing button 48 can be used to reduce the size of a note as well as increase the size of a note. However, care should be taken while decreasing the size of the note, since part or all of the text, graphical, or data objects for the note could be obscured from view if the height of the note is insufficient to accommodate them.

Figure 13:
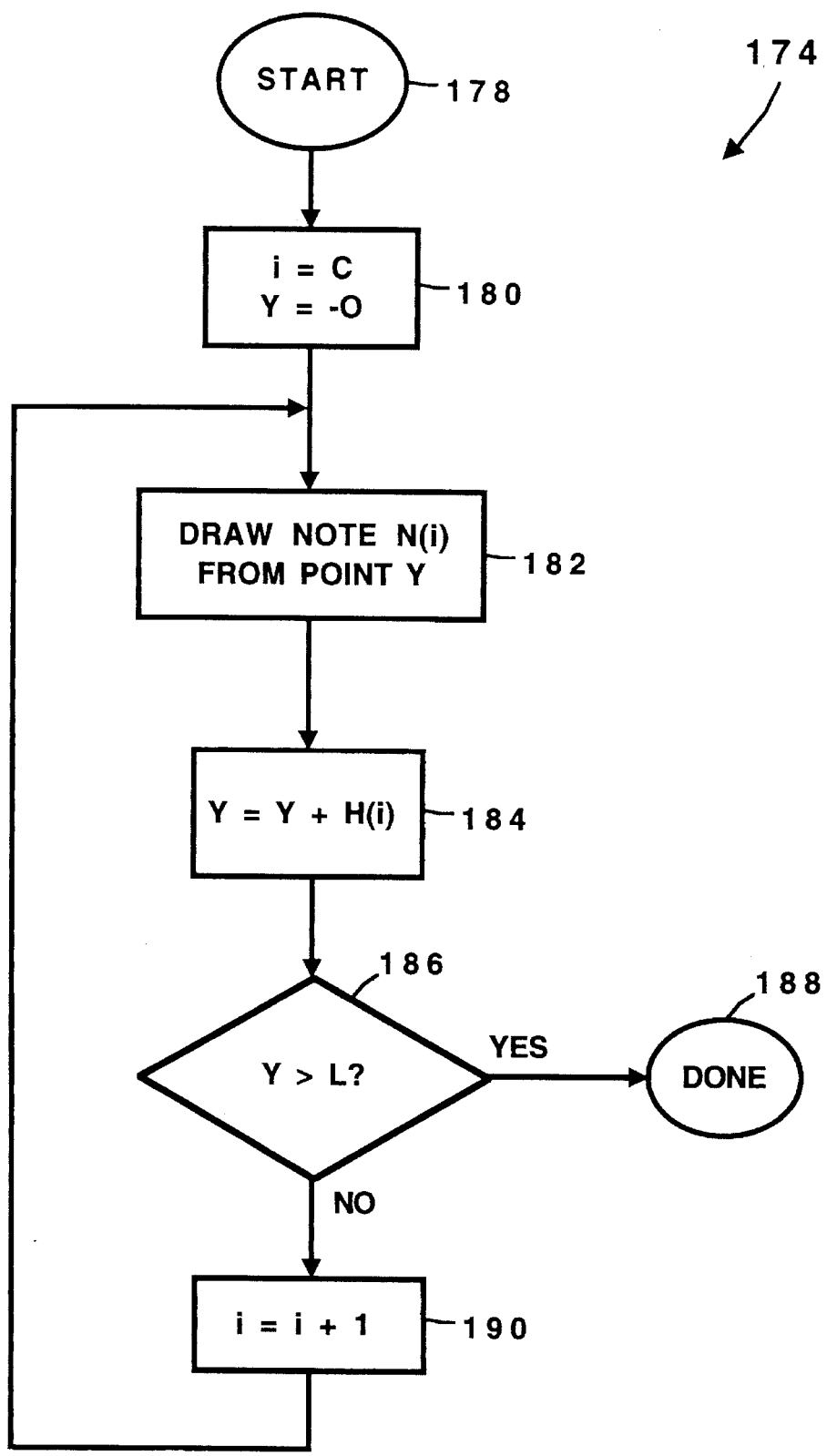
FIG. 13 is a flow diagram illustrating a method for drawing all visible images on the screen of a computer display assembly.

FIG. 13 illustrates a process 174 for re-drawing all visible notes on the screen 38 of the pen-based computer system 10.

The step 174 is preferably implemented by graphics software such as QUICKDRAW from Apple Computer, Inc. of Cupertino, Calif. A description of the QUICKDRAW graphics software is found in the book *Inside Macintosh, Volumes I, II, and III*, by C. Rose et al., Addison-Wesley Publishing Company, Inc., July 1988. With such graphics software, a header bar, for example, can be drawn by simply specifying the coordinates of the beginning and the end of the bar, along with the thickness of the bar, its pattern, etc.

The process 174 begins at 178 and initializes variables in a step 180. Two of these variables include the counter i which is set to the current note number C, and the variable Y which is set to the negative of the offset o. Next, in step 182, the note N(i) is drawn from the point Y, i.e., from the current offset position. This step 182 includes the sub-steps of drawing the header bar B(i), the date D(i), the note number i, the text object TEXT(i), the graphic object GRAPHIC(i), the data object DATA(i), etc. This will result in an image of part or all of note N(i) being displayed on the screen 38. Next, in a step 184, the variable Y is increased by the height of note N(i) i.e., Y=Y+H(i). In a decision step 186, the value of Y is compared to L, the length of the screen 38. If Y is greater than L, then the process 174 is completed as is indicated at 188. Otherwise, the counter i is incremented by 1 in a step 190 and steps 182, 184 and 186 are repeated. Essentially, the decision step 186 determines whether part or all of the next note will fit on the screen, and if it will, the CPU 12 causes that partial or complete note to be drawn on the screen. Steps 182–190 are repeated until all visible notes are displayed on the screen 38.

Figure 14:
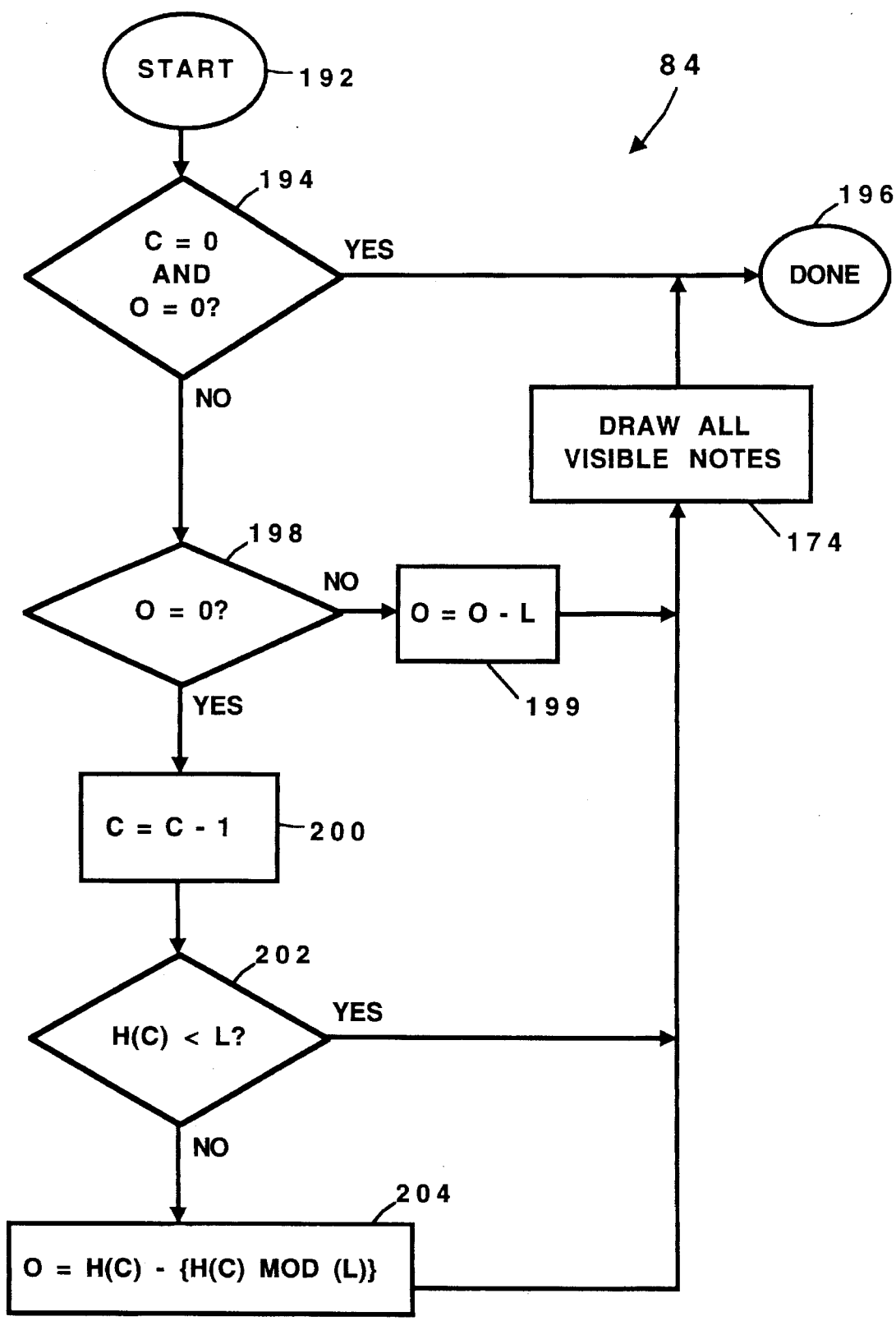
FIG. 14 is a flow diagram of a method for making a quantized up-scroll through notes on a computer screen.

In FIG. 14, the step 84 of processing the up-scroll is illustrated in greater detail. The process begins at 192, and a decision is made as to whether the current note number C and the current offset o are both equal to zero in a step 194. If they are, the header bar B(1) of note N(1) is at the top of the screen 38 and no further up-scrolling is possible as indicated at 196. Otherwise, step 198 determines whether the offset o is equal to zero, and if it is not then the value of the offset o is reduced by the length of the screen L in a step 199 so that another screen-full of images can be displayed. If the offset o is equal to zero, the current note number C is decremented by 1 in a step 200, and in a step 202 it is determined whether the height H(C) of note N(C) is less than L, the length of the screen 38. If it is less, the entire note N(C) will fit on the screen 38. If H(C) is not less than L, the entire note N(C) will not fit on the screen 38 and a new offset o is calculated as indicated in step 204. This new offset o is equal to:

$$o=H(C)-\{H(C) \bmod L\}$$

where $\{H(C) \bmod L\}$ is the modulus of H(C) and L, i.e. it is equal to the remainder of the quotient H(C)/L. Finally, after steps 199 or 204 are completed or if the decision step 202 is true, all visible notes are drawn in step 174 before the completion of the process at 196.

Figure 15:
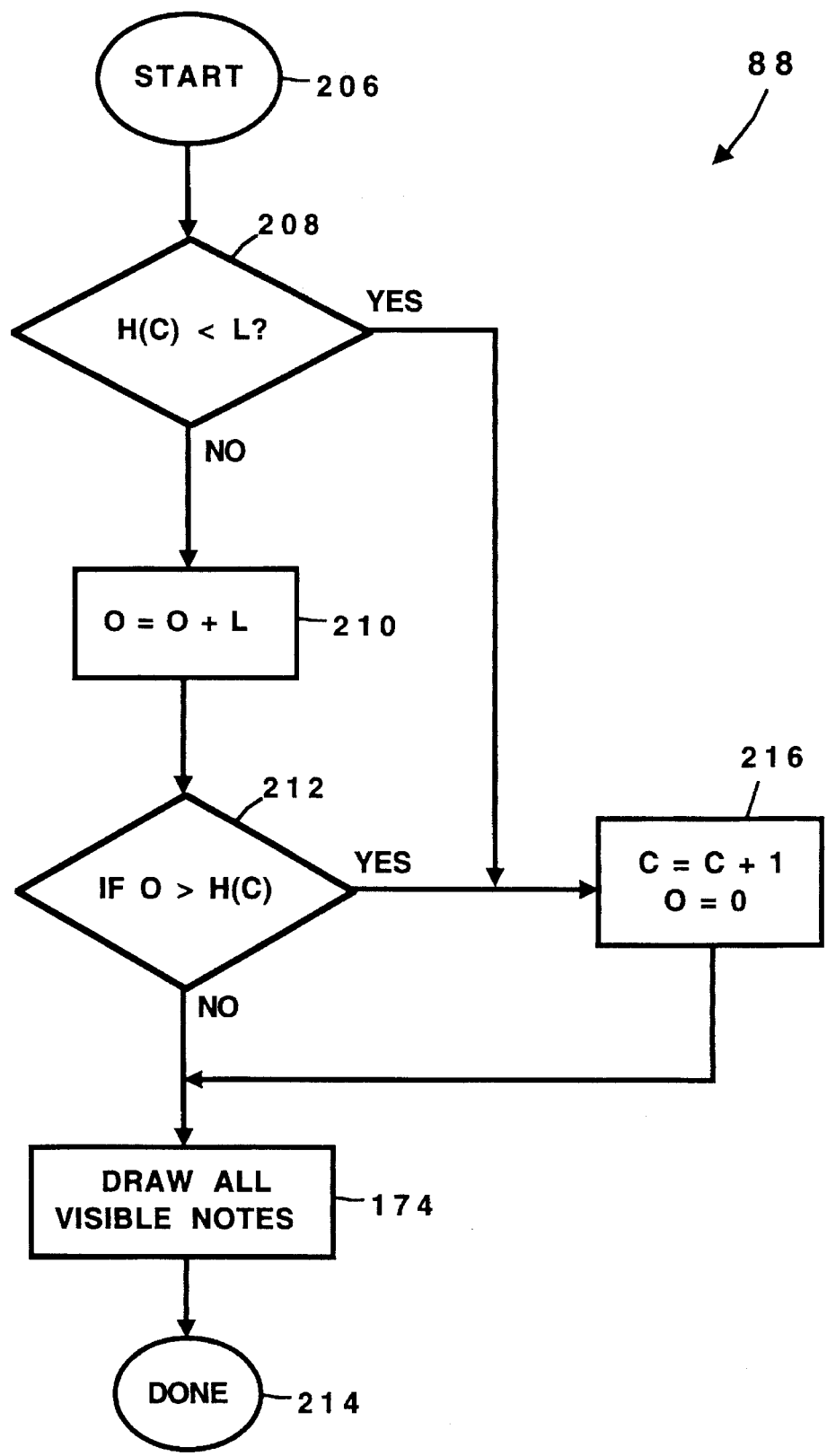
FIG. 15 is a flow diagram which illustrates a method for making a quantized down-scroll through notes on a computer screen.

The process down-scroll step 88 is illustrated in greater detail in FIG. 15. The process starts at 206, and the height H(C) of the current note C is compared with the length L of screen 38 in a step 208. If the height is less than the screen length, then the offset o is increased by the length of the screen L in a step 210. Next, in step 212, the offset is compared with the height H(C) of the current note and, if it is less than that height, all visible notes are drawn in a step 174 and the process is completed as indicated at 214. Otherwise, if step 212 determines that the offset o is greater than the height H(C) of the current note, file current note C is incremented by 1 and the offset o is set to zero in a step 216.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit of the present invention. For example, while the creation of new notes has been described as the division of previous notes, it is also possible to characterize note creation as adding additional notes to one or more previous notes. It is therefore intended that the following appended claims include all such alterations, modifications and permutations as fall within the true spirit and scope of the present invention.

What is claimed is:

1. A method for manipulating notes on the screen of a computer display comprising:

generating an initial note area on a screen of a computer display;

dividing said initial note area into a plurality of note areas in response to at least one division gesture implemented by moving a pointer across the width of the screen such that a left edge of the division gesture is within a first defined distance of a left side of said computer display and a right edge of the division gesture is within a second defined distance of a right side of said computer display, wherein the division gesture is made in a horizontal motion having a slope of less than a predefined slope value, and wherein each division gesture creates divider indicia in the form of a header bar said screen which visually separates an immediately preceding note-area and an immediately having a slope of less than a predefined slope value, and wherein each division gesture creates divider indicia in the form of a header bar on said screen which visually separates an immediately preceding note area and an immediately subsequent note area, the header bar being associated with the immediately subsequent note area, the header bar including a sizing button, the sizing button being operative to adjust a height of the immediately subsequent note area without adjusting the immediately preceding note area;

modifying the size of a selected note area, the selected note area including a specific header bar having an associated text heading and an associated sizing button, the size modification performed in response to a sizing gesture made to the associated sizing button;

in response to a down-scroll command received for a given note area having an associated header bar, performing one of the following:

(a) when the given note area has a subsequent area that is not displayed on the screen and the associated header bar is displayed but is not positioned at an upper portion of the screen, scrolling down and displaying the associated header bar at the upper portion of the screen thereby displaying at least a portion of the subsequent area;

(b) when the given note area has the subsequent area that is not displayed on the screen and the associated header bar is either displayed positioned at the upper portion of the screen or not displayed, scrolling down and displaying the subsequent area positioned beginning at the upper portion of the screen; and (c) when the given note area has no subsequent area not displayed and a subsequent note is available for display, displaying the subsequent note such that the subsequent note's header bar is located on the upper portion of the screen; and in response to an up-scroll command received for the given note area, performing one of the following:

(d) when the given note area has a preceding area which is not displayed on the screen and the preceding area's height is larger than a height of the screen, displaying a bottom most portion of the preceding area;

(e) when the given note area has the preceding area which is not displayed on the screen and the preceding area's height is less than or equal to a height of the screen, displaying the given note area such that the associated header bar is positioned at the upper portion of the screen: and (f) when the given note area has no preceding area not displayed and a preceding note is available for display, displaying the preceding note area such that the preceding note area's header bar is located on the upper portion of the screen.

2. A computer readable medium containing computer program instructions for:

generating an initial note area on the screen of the computer display;

dividing said initial note area into a plurality of note areas in response to at least one division gesture implemented by moving a pointer across the width of the screen such that a left edge of the division gesture is within a first defined distance of a left side of said computer display and a right edge of the division gesture is within a second defined distance of a right side of said computer display, wherein the division gesture is made in a horizontal motion having a slope of less than a pre-defined slope value, and wherein each division gesture creates divider indicia in the form of a header bar on said screen which visually separates an immediately preceding note area and an immediately subsequent note area, the header bar being associated with the immediately subsequent note area, the header bar including a sizing button, the sizing button being operative to adjust a height of the immediately subsequent note area without adjusting the immediately preceding note area;

in response to a down-scroll command received for a given note area, performing one of the following:

(a) when the given note area has a subsequent area that is not displayed on the screen and the associated header bar is displayed but is not positioned at an upper portion of the screen, scrolling down and displaying the associated header bar at the upper portion of the screen thereby displaying at least a portion of the subsequent area;

(b) when the given note area has the subsequent area that is not displayed on the screen and the associated header bar is either displayed positioned at the upper portion of the screen or not displayed, Scrolling down and displaying the subsequent area positioned beginning at the upper portion of the screen; and (c) when the given note area has no subsequent area not displayed and a subsequent note is available for display, displaying the subsequent note such that the subsequent note's header bar is located on the upper portion of the screen; and in response to an up-scroll command received for the given note area, performing one of the following:

(d) when the given note area has a preceding area which is not displayed on the screen and the preceding area's height is larger than a height of the screen, displaying a bottom most portion of the preceding area;

(e) when the given note area has the preceding area which is not displayed on the screen and the preceding area's height is less than or equal to a height of the screen, displaying the given note area such that the associated header bar is positioned at the upper portion of the screen; and (f) when the given note area has no preceding area not displayed and a preceding note is available for display, displaying the preceding note area such that the preceding note area's header bar is located on the upper portion of the screen.

3. A computer readable medium as recited in claim 2 wherein said computer program instruction for generating an initial note area on the computer screen includes creating a first data structure including a note number and a note height dimension.

4. A computer readable medium as recited in claim 2 wherein said computer program instruction for dividing said initial note area comprises computer program instructions for:

detecting a theoretical line drawn on said display by said pointer;

determining whether said theoretical line is a division gesture; and generating a new header bar on said computer display for a new note area if said theoretical line is determined to be a division gesture.

5. A computer readable medium as recited in claim 4 wherein said computer program instruction or detecting a theoretical line comprises computer program instructions for:

collecting a plurality of sample points corresponding to a movement of said pointer across said display; and forming said theoretical line from at least two of said plurality of sample points.

6. A computer readable medium as recited in claim 4 wherein said computer program instruction for determining whether said theoretical line is a division gesture includes one or more of the following computer program instructions for:

determining whether there is a sample point further from said theoretical line than a predetermined maximum distance value;

determining whether the absolute value of a sum of the signed distances of said plurality of sample points from said theoretical line is greater than a predetermined maximum sum value;

determining whether the absolute value of a slope of said theoretical line differs from a predetermined header bar slope by more than a predetermined maximum slope value; and determining whether either end of said theoretical line is separated from an edge of said screen by more than a predetermined maximum margin value wherein when one of the determining steps fails, said theoretical line is not a division gesture.

7. A computer readable medium having a computer program executable to move divider indicia in the form of a header bar displayed on a computer display as a linear region which separates a first note area from an adjacent second note area on a screen of the computer display, the header bar being associated with the second note area and including a sizing button, the computer program comprising the computer instructions for:

detecting the selection of the header bar by a pointer;

detecting a sizing gesture made with said pointer on said header bar, the sizing gesture engaging the sizing button;

moving said header bar as indicated by said sizing gesture, the movement of the header bar adjusting a height of the second note area without adjusting the first note area;

in response to a down-scroll command received for a given note area, performing one of the following:

(a) when the given note area has a subsequent area that is not displayed on the screen and the associated header bar is displayed but is not positioned at an upper portion of the screen, scrolling down and displaying the associated header bar at the upper portion of the screen thereby displaying at least a portion of the subsequent area;

(b) when the given note area has the subsequent area that is not displayed on the screen and the associated header bar is either displayed positioned at the upper portion of the screen or not displayed, scrolling down and displaying the subsequent area positioned beginning at the upper portion of the screen; and (c) when the given note area has no subsequent area not displayed and a subsequent note is available for display, displaying the subsequent note such that the subsequent note's header bar is located on the upper portion of the screen; and in response to an up-scroll command received for the given note area, performing one of the following:

(d) when the given note area has a preceding area which is not displayed on the screen and the preceding area's height is larger than a height of the screen displaying a bottom most portion of the preceding area;

(e) when the given note area has the preceding area which is not displayed on the screen and the preceding area's height is less than or equal to a height of the screen, displaying the given note area such that the associated header bar is positioned at the upper portion of the screen; and (f) when the given note area has no preceding area not displayed and a preceding note is available for display, displaying the preceding note area such that the preceding note area's header bar is located on the upper portion of the screen.

8. A computer readable medium as recited in claim 7 wherein said pointer comprises stylus means contacting a screen of a pen-based computer system.

9. A computer readable medium as recited in claim 8 wherein said sizing gesture detected by a computer instruction comprises contacting said stylus with said screen over said header bar and moving said stylus without lifting said stylus from said screen.

10. A computer readable medium as recited in claim 7 wherein said computer program instruction for moving said header bar comprises:

changing a height dimension of a note associated with said divider bar; and re-drawing at least said note on said screen.

11. A pointer-based computer system comprising:

a central processing unit;

a memory accessible by said central processing unit;

a computer display having a screen;

a pointer;

means for generating an initial note area on the screen of the computer display;

means for dividing said initial note area into a plurality of note areas in response to at least one division gesture implemented by moving the pointer across the width of the screen such that a left edge of the division gesture is within a first defined distance of a left side of said computer display and a right edge of the division gesture is within a second defined distance of a right side of said computer display, wherein the division gesture is made in a horizontal motion having a slope of less than a predefined slope value, and wherein each division gesture creates divider indicia in the form of a header bar on said screen which visually separates an immediately preceding note area and an immediately subsequent note area, the header bar being associated with the immediately subsequent note area, the header bar including a sizing button, the sizing button being operative to adjust a height of the immediately subsequent note area without adjusting the immediately preceding note area; and a quantized scrolling mechanism operative to respond to a down-scroll command received for a given note area by performing one of the following:

(a) when the given note area has a subsequent area that is not displayed on the screen and the associated header bar is displayed but is not positioned at an upper portion of the screen, scrolling down and displaying the associated header bar at the upper portion of the screen thereby displaying at least a portion of the subsequent area;

(b) when the given note area has the subsequent area that is not displayed on the screen and the associated header bar is either displayed positioned at the upper portion of the screen or not displayed, scrolling down and displaying the subsequent area positioned beginning at the upper portion of the screen; and (c) when the given note area has no subsequent area not displayed and a subsequent note is available for display, displaying the subsequent note such that the subsequent note's header bar is located on the upper portion of the screen, the quantized scrolling mechanism further operative to respond to an up-scroll command received for the given note area by performing one of the following:

(d) when the given note area has a preceding area which is not displayed on the screen and the preceding area's height is larger than a height of the screen, displaying a bottom most portion of the preceding area;

(e) when the given note area has the preceding area which is not displayed on the screen and the preceding area's height is less than or equal to a height of the screen, displaying the given note area such that the associated header bar is positioned at the upper portion of the screen; and (f) when the given note area has no preceding area not displayed and a preceding note is available for display, displaying the preceding note area such that the preceding note area's header bar is located on the upper portion of the screen.

12. A pointer-based computer system as recited in claim 11 wherein said means for generating an initial note area on the computer screen includes means for creating a first data structure including a note number and a note height dimension.

13. A pointer-based computer system as recited in claim 11 wherein said means for dividing said initial note area comprises:

means for detecting a theoretical line drawn on said display by said pointer;

means for determining whether said theoretical line is a division gesture; and means for generating a header bar on said computer display for a new note area if said theoretical line is determined to be a division gesture.

14. A pointer-based computer system as recited in claim 13 wherein said means for detecting a theoretical line comprises:

means for collecting a plurality of sample points corresponding to a movement of said pointer across said display; and means for forming said theoretical line from at least two of said plurality of sample points.

15. A pointer-based computer system as recited in claim 14 wherein said means for determining whether said theoretical line is a division gesture includes one or more of the following:

means for determining whether there is a sample point further from said theoretical line than a predetermined maximum distance value;

means for determining whether the absolute value of a sum of the signed distances of said plurality of sample points from said theoretical line is greater than a predetermined maximum sum value;

means for determining whether the absolute value of a slope of said theoretical line differs from a predetermined header bar slope by more than a predetermined maximum slope value; and means for determining whether either end of said theoretical line is separated from an edge of said screen by more than a predetermined maximum margin value wherein when one of the determining means fails, said theoretical line is not a division gesture.

16. A computer readable medium having a computer program for manipulating notes on the screen of a computer display, the computer program comprising the computer instructions for:

generating an initial note area on a screen of a computer display;

dividing said initial note area into a plurality of note areas in response to at least one division gesture implemented by moving a pointing means across the width of the screen such that a left edge of the division gesture is within a first defined distance of a left side of said computer display and a right edge of the division gesture is within a second defined distance of a right side of said computer display, wherein the division gesture is made in a horizontal motion having a slope of less than a predefined slope value, and wherein each division gesture creates divider indicia in the form of a header bar on said screen which visually separates two adjacent note areas, said header bar being displayed on said computer display as a horizontal region having indicia pertaining to a note including a creation date;

modifying the height of a selected note area in response to a gesture made on said header bar associated with said selected note area; and scrolling at least one note area in response to a scrolling command.

17. A computer readable medium as recited in claim 16 wherein said computer instruction for generating an initial note area on a computer screen includes creating a first data structure including a note number designation and a note height dimension.

18. A computer readable medium as recited in claim 16 wherein said computer program instruction for dividing said initial note area comprises:

detecting a theoretical line drawn on said display by said pointing means;

determining whether said theoretical line is a division gesture; and generating a header bar on said computer display for a new note area if said theoretical line is determined to be a division gesture.

19. A computer readable medium as recited in claim 18 wherein said computer program instruction for detecting a theoretical line comprises:

collecting a plurality of sample points corresponding to a movement of said pointing means across said display; and forming said theoretical line from at least two of said plurality of sample points.

20. A computer readable medium as recited in claim 18 wherein said computer program instruction for determining whether said theoretical line is a division gesture includes the following computer instructions for:

determining whether there is a sample point farther from said theoretical line than a predetermined maximum distance value;

determining whether the absolute value of a sum of the signed distances of said plurality of sample points from said theoretical line is greater than a predetermined maximum sum value;

determining whether the absolute value of a slope of said theoretical line differs from a predetermined header bar slope by more than a predetermined maximum slope value; and determining whether either end of said theoretical line is separated from an edge of said screen by more than a predetermined maximum margin value;

wherein when one of the determining steps fails, said theoretical line is not a division gesture.

21. A computer readable medium as recited in claim 16 wherein said computer program instruction for modifying the size of a selected note area comprises:

detecting said gesture; and moving said divider indicia in response to said gesture.

22. A computer readable medium as recited in claim 16 wherein said computer program instruction for scrolling at least one note area comprises:

detecting said scrolling command; and scrolling said at least one note area in a direction indicated by said scrolling command such that divider indicia on said screen move in discrete jumps such that data input on said at least one note area appears in approximately the same position at which it was originally input.

23. A computer readable medium storing a computer program for generating divider indicia on a computer display, the computer program comprising computer instructions for:

detecting a division gesture implemented by moving a pointing means across the width of a screen such that a left edge of the division gesture is within a first defined distance of a left side of said computer display and a right edge of the division gesture is within a second defined distance of a right side of said computer display, wherein the division gesture is made in a horizontal motion having a slope of less than a predefined slope value; and generating divider indicia in the form of a header bar on said screen as positioned by said division gesture said header bar being displayed on said computer display as a horizontal region having indicia pertaining to a note including a creation date.

24. A computer readable medium as recited in claim 23 wherein said computer program instruction for detecting a division gesture comprises:

creating a theoretical line from a gesture made on said screen by said pointing means;

comparing said theoretical line to predetermined criteria; and recognizing a division gesture if said theoretical line meets said predetermined criteria.

25. A computer readable medium as recited in claim 24 wherein said computer program instruction for creating a theoretical line comprises:

collecting a plurality of sample points along a gesture path;

forming said theoretical line including at least two of said plurality of sample points.

26. A computer readable medium as recited in claim 25 wherein said theoretical line is created from two sample points selected at or near opposing ends of said gesture path.

27. A computer readable medium as recited in claim 25 wherein said theoretical line is created from three or more sample points.

28. A computer readable medium as recited in claim 27 wherein said theoretical line is created from at least a majority of said sample points by a least-mean-square (LMS) computer readable medium.

29. A computer readable medium as recited in claim 25 wherein said computer program instruction for comparing said theoretical line to said predetermined criteria comprises:

determining whether any sample point is further from said theoretical line than a predetermined amount.

30. A computer readable medium as recited in claim 25 wherein said computer program instruction for comparing said theoretical line to said predetermined criteria comprises:

determining whether the absolute value of a sum of the signed distances of said plurality of sample points from said theoretical line is greater than a predetermined amount.

31. A computer readable medium as recited in claim 25 wherein said computer program instruction for comparing said theoretical line to said predetermined criteria comprises:

determining whether the absolute value of a slope of said theoretical line differs from a predetermined slope by more than a predetermined amount.

32. A computer readable medium as recited in claim 25 wherein said computer program instruction for comparing said theoretical line to said predetermined criteria comprises:

determining whether either end of said theoretical line is separated from an edge of said screen by more than a predetermined amount.

33. A pointer-based computer system comprising:

a central processing unit;

a memory accessible by said central processing unit;

a computer display having a screen;

a pointer;

means for generating an initial note area on the screen of the computer display;

means for dividing said initial note area into a plurality of note areas in response to at least one division gesture implemented by moving the pointer across the width of the screen such that a left edge of the division gesture is within a first defined distance of a left side of said computer display and a right edge of the division gesture is within a second defined distance of a right side of said computer display, wherein the division gesture is made in a horizontal motion having a slope of less than a predefined slope value, and wherein each division gesture creates divider indicia in the form of a header bar on said screen which visually separates two adjacent note areas; and means for scrolling operable to scroll at least one note area in response to a scrolling command.

34. A pointer-based computer system as recited in claim 32 wherein said means for generating an initial note area on the computer screen includes means for creating a first data structure including a note number and a note height dimension.

35. A pointer-based computer system as recited in claim 33 wherein said means for dividing said initial note area comprises:

means for detecting a theoretical line drawn on said display by said pointer;

means for determining whether said theoretical line is a division gesture; and means for generating a header bar on said computer display for a new note area if said theoretical line is determined to be a division gesture.

36. A pointer-based computer system as recited in claim 34 wherein said means for detecting a theoretical line comprises:

means for collecting a plurality of sample points corresponding to a movement of said pointer across said display; and means for forming said theoretical line from at least two of said plurality of sample points.

37. A pointer-based computer system as recited in claim 34 wherein said means for determining whether said theoretical line is a division gesture includes one or more of the following:

means for determining whether there is a sample point farther from said theoretical line than a predetermined maximum distance value;

means for determining whether the absolute value of a sum of the signed distances of said plurality of sample points from said theoretical line is greater than a predetermined maximum sum value;

means for determining whether the absolute value of a slope of said theoretical line differs from a predetermined header bar slope by more than a predetermined maximum slope value; and means for determining whether either end of said theoretical line is separated from an edge of said screen by more than a predetermined maximum margin value wherein when one of the determining means fails, said theoretical line is not a division gesture.

* * * * *